United States Patent [19]

Schlosser

[11] Patent Number: 5,058,930

[45] Date of Patent: Oct. 22, 1991

[54] HIGH PRESSURE COUPLING WITH PROVISION FOR PREVENTING SEPARATION OF PARTS AND WITH ANTI-GALLING PROVISION

[75] Inventor: Alvin L. Schlosser, Melville, N.Y.

[73] Assignee: Lourdes Industries, Hauppauge, N.Y.

[21] Appl. No.: 491,119

[22] Filed: Mar. 9, 1990

[51] Int. Cl.$^5$ ............................................. F16L 55/00
[52] U.S. Cl. .................................... 285/92; 285/94; 285/319; 285/921
[58] Field of Search ............... 285/94, 92, 319, 320, 285/382.1, 921, 394, 391, 385

[56] References Cited

U.S. PATENT DOCUMENTS

| | | | |
|---|---|---|---|
| 763,317 | 6/1904 | Nelson | 285/320 |
| 1,914,736 | 6/1933 | Coutu | 285/92 X |
| 2,523,578 | 9/1950 | Lewis | 285/353 X |
| 3,135,537 | 6/1964 | Scott | 285/353 X |
| 3,418,010 | 12/1968 | Buckner | 285/92 |
| 3,915,478 | 10/1975 | Al et al. | 285/342 X |
| 4,451,069 | 5/1984 | Melone | 285/315 X |
| 4,705,302 | 11/1987 | Beiley | 285/94 X |

Primary Examiner—Peter M. Cuomo
Assistant Examiner—Heather Chun
Attorney, Agent, or Firm—Alan K. Roberts

[57] ABSTRACT

A high pressure coupling is provided which comprises an adjustment nut with nipples extending therefrom in axial extension of one another. The nipples are provided with exterior threads and with conically shaped ends which are respectively engaged by ferrules. Each of these ferrules is engaged by a coupling member having an interior thread which is in engagement with the threads provided on the associated nipple. Adjustment of the threads operates to pull the ferrules against the associated nipples. On each nipple is mounted a frusto-conical ramp adjacent which is provided an annular groove. Each coupling member is provided with a cylindrical arrangement of spaced fingers or a thin wall cylinder having protruding tips directed radially inwards. These fingers or the cylinder with their respective tips ride up the ramps until the tips extend beyond the ramps and are loosely accommodated in their respectively associated annular grooves. The accommodation of the tips in the annular grooves serves to lock the associated ferrules to the associated nipples to prevent accidental detachment thereof. The fingers pressing against the ramps serve to vector forces to remove play from between the inter-engaged threads.

25 Claims, 5 Drawing Sheets 5,058,930

HIGH PRESSURE COUPLING WITH PROVISION FOR PREVENTING SEPARATION OF PARTS AND WITH ANTI-GALLING PROVISION

FIELD OF INVENTION

This invention relates to coupling devices and more particularly to high pressure couplings suitable for making connections in high pressure pneumatic or hydraulic circuits and the like.

BACKGROUND

For purposes of providing couplings in high pressure fluid circuits and the like, use has been made of wired fittings to lock parts together to prevent the decoupling thereof during operation. Such devices are known as lockwire fluid fittings and one such device is disclosed in U.S. Pat. No. 3,807,774 (Joseph W. Heath, Jr.) which issued Apr. 30, 1974. Therein are disclosed separate hydraulic fittings which are connected together by nuts at least one of which is engaged by a wire fitting in order to prevent separation of these components during operation. Such an arrangement is especially useful in aircraft wherein operation under conditions of high pressure and vibration sometimes result in the separation of parts to the detriment of satisfactory operation of the aircraft in which such a fitting is incorporated.

In an investigation of the novelty of the present invention, a number of patents have been found. These include U.S. Pat. Nos. 2,419,702 (F. A. Barnes); 2,420,778 (R. E. Herold); 3,053,357 (W. E. Stanger); 3,915,478 (Al et al); and 4,451,069 (Melone).

The Barnes U.S. Pat. No. 2,419,702 reveals the use of a coupling member to connect two members together. There is a provision for the striking out and peening over of a tongue from the metal of the coupling member. The tongue prevents unscrewing of one part from another. There is, however, no suggestion in this patent of a ramp providing for the taking of play out of and adding frictional torque to resist unlocking of a threaded engagement.

The Melone U.S. Pat. No. 4,451,069 is provided with cantilevers which bear bulbous tips adapted for being accommodated in an annular groove. A plurality of fingers are provided which are in cylindrical arrangement, the fingers being separated by respective slots. The bulbous tip of each finger is accommodated loosely in the associated annular groove.

The Herold U.S. Pat. No. 2,420,778 reveals the use of a coupling member to bring about engagement between axially displaceable parts. Therein, a tube is clamped between one part and an external sleeve to provide what looks like a ramp type engagement but which actually is unlike the ramp type engagement discussed hereinbelow.

The Al et al U.S. Pat. No. 3,915,478 includes an external sleeve for threadably engaging an interior sleeve such as to provide a coupling for a compression-type pipe. The coating terminates in a thread formation of composition tandemly juxtaposed and comprising an extension of metal thread thereon.

The Stanger U.S. Pat. No. 3,053,357 indicates a design consisting of a circular arrangement of cantilever like fingers with bulbous tips. The bulbous tips are accommodated loosely in an annular slot arrangement. There is, however, no threaded engagement which is enhanced by the engagement of a frustoconical ramp by a circular arrangement of fingers as discussed below.

None of the aforesaid patents discloses a coupling, suitable for operation in high pressure fluid circuits and the like, which provides for locking parts together without the use of wire connectors while additionally providing for improving the inter-engagement between threadably coupled components.

SUMMARY OF INVENTION

It is an object of the invention to provide a coupling for a fluid circuit or the like which provides improvements over lockwired couplings and which is generally an improved high pressure coupling.

It is a further object of the invention to provide an improved coupling which prevents the separation of parts during operation particularly under conditions of high pressure and vibration.

It is a further object of the invention to provide an improved coupling which is capable of thousands of re-uses, since neither installation loads or operational loads exceed the yield strength of the material.

It is a further object of the invention to provide an improved coupling, the design features of which are common for materials covering the temperature range of 1100 degrees F or higher down to cryogenic temperatures.

It is yet another object of the invention to provide an improved high pressure coupling which functions additionally to prevent leaks therein.

Yet another object of the invention is to provide an improved coupling having universal application as regards size thereby to minimize inventory requirements.

Still another object of the invention is provide an improved coupling which can be manufactured by the utilization of mass production techniques and which is relatively inexpensive without the sacrifice of high quality coupling.

It is a further object of the invention to provide an improved coupling which, without the use of lockwires, operates in a positive manner to prevent the separation of parts.

Still another object of the invention is to provide an improved high pressure coupling which is readily inspected to confirm that a positive coupling has been effected.

Still a further object of the invention is to provide an improved coupling which avoids the need for time consuming installations and which furthermore makes possible installations which would not be possible with the use of lockwires or the like.

Still another object of the invention is to provide an improved high pressure coupling which is rugged in construction and can operate without failure in conditions of high temperature, high pressure and extreme vibration.

Another object of the invention is to provide an improved coupling having minimized fretting or galling potential.

Still another object of the invention is to provide an improved high pressure coupling which is reusable and which does not require special tools or support equipment.

Yet another object of the invention is to provide an improved coupling which is repairable and/or replaceable.

Yet another object of the invention is to provide an improved connection or joint which avoids safety or mission critical events and which incorporates a locking feature which provides a means of easily verifying functional integrity.

In achieving the above and other objects of the invention, there is provided a coupling having, for example, two sections each of which comprises first and second axially displaceable parts. The first part includes, for example, an exterior thread encircling the same. In addition there is provided a coupling component encircling these parts and including an interior thread to engage the exterior thread with limited play being possible between these threads. The coupling component forces the parts together responsive to adjustment of the engagement between the threads. In accordance with the invention, the first part includes a ramp and the coupling component includes cantilever arrangement adapted for riding up the ramp. The cantilever arrangement presses against the ramp to urge the threads together and minimize play and provide additional untorquing resistance.

Additionally, the cantilever arrangement on the second part can be replaced by a thin wall barrel with short slots. The barrel, as machined, provides an interference fit when assembled to the ramp on the first part. This barrel presses against the ramp to urge the threads together, minimize play, and provide additional untorquing resistance.

According to a feature of the invention, the first part is provided with a depression adjacent the ramp. The cantilever arrangement includes at least one tip adapted for riding up the ramp and being received in loose relationship in the aforementioned depression. The cantilever arrangement presses against the ramp when the tip is received in the depression.

According to a more specific feature the depression is provided in the form of an annular groove and the ramp is of frusto-conical conformation. The alternate thin wall cylinder arrangement will preferably in accordance with the invention, include a cylindrical arrangement with short slots at the entering edge. The barrel and ramp are arranged to having facing surfaces at least one of which is coated with a lubricant or which in other words has a lubricant coating. The lubricant as will be discussed in greater detail hereinbelow may, for example, be molybdenum disulphide and graphite provided in a silicate binder or the like. The aforesaid cylinder which operates in conjunction with this lubricant will preferably have a tensile yield strength in the order of magnitude of at least about 140,000 p.s.i.

The length of the aforesaid fingers is minimized (optomized) by using the ratio of the modulus of elasticity divided by the allowable tensile bending stress for the material. This ratio, with no safety factor included, for minimized finger length will vary between about 200 to 100.

As will also be shown hereinbelow, the first part mentioned above includes a nipple having a conical end and the second part is provided with a bore having a conical extremity in a preferred embodiment of the invention. The conical end is received in the conical extremity of the aforementioned bore. Furthermore the coupling component includes a protrusion for cupping against the second part to pull the same into engagement with the first part with the conical end of the nipple in the conical end of the bore.

In accordance with further features of the invention as will be explained hereinafter, the first part and coupling component include co-axial sections having polygonal surfaces adapted for engagement by a tightening tool. Moreover the aforementioned tip is a radial projection and is positioned to lift the cantilever or cylinder arrangement off the ramp until the projection is received in the depression. Still further, it will be noted in the description which follows hereinbelow that the cylindrical arrangement and frusto-conical ramp are co-axial. Additionally, it will be noted that the ramp preferably defines an angle of about 2 degrees ±30' with the axis.

Among further features of the invention is that the annular groove mentioned hereinabove is spaced from the section of the first part having a polygonal surface by a distance no greater than about the breadth of the groove. Additionally, the ramp preferably has a lift in the order of about 0.001 to 0.003 inches.

Among other features of the invention are arrangements whereby the cylindrical arrangement has a diameter exceeding the outer diameter of the thread on the first part and that the projection extends radially inwards by an order of magnitude of about 0.010 inches. Other specific features find the ramp having an axial extent of an order of magnitude of about 0.135 inches and the groove having a breadth in the order magnitude of about 0.062 inches.

Other aspects of preferred embodiments of the invention include that the first and second parts define a continuous bore and that the aforementioned fingers or cylinder have a thickness in the order of magnitude of about 0.010 inches. In one specific arrangement, a tube/hose may be provided having an end entrapped between the conical end of the nipple and the second part. Also to be included as a feature of the invention is the fact that the aforesaid arrangements may be provided in what is substantially a mirror image reflection of one another so that there are two ramps with two cylindrical arrangements of fingers or two cylinders riding up the respective ramps and accommodated in respective annular grooves.

Other objects, features and advantages of the invention will be found in the detailed description which follows hereinbelow as illustrated in the accompanying drawing.

DETAILED DESCRIPTION

Figure 1:
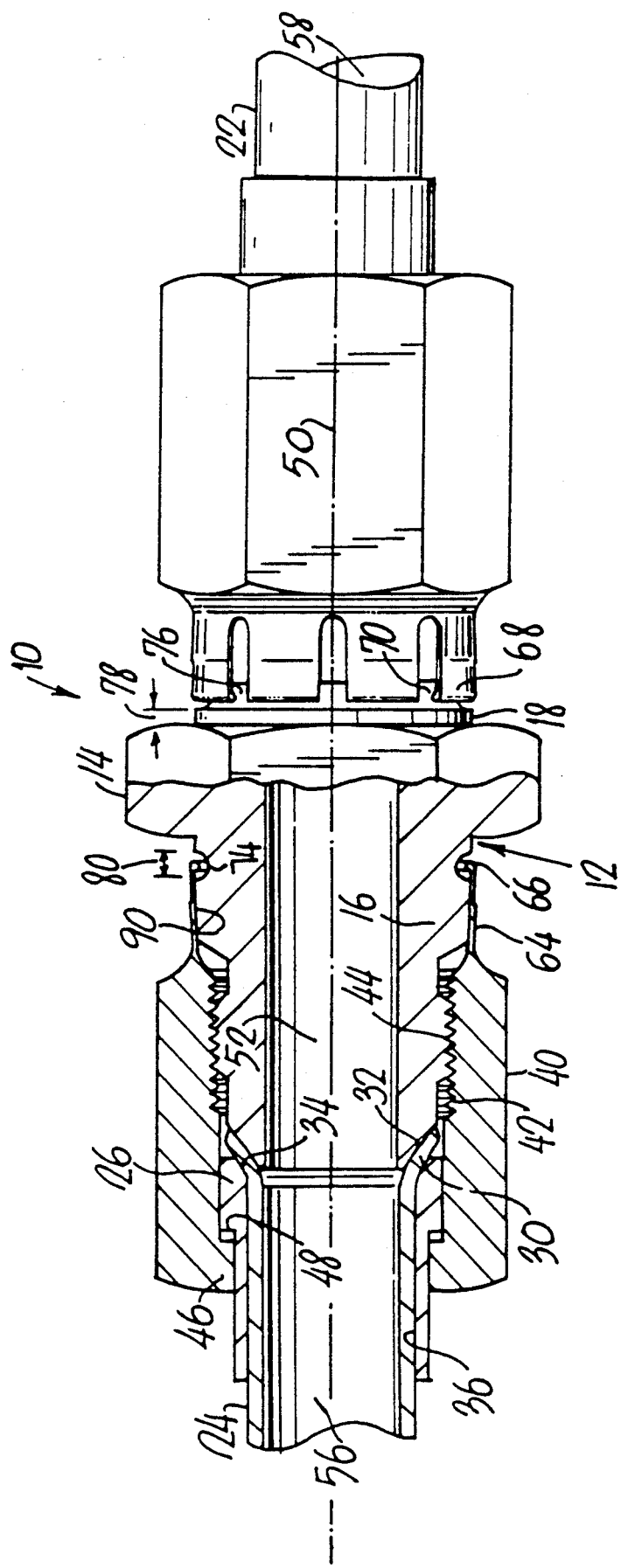
FIG. 1 is a side view, partially in section, of a high pressure coupling provided in accordance with one embodiment of the invention, a portion of a fluid circuit being shown in phantom lines.

The high pressure coupling provided in accordance with the invention is illustrated in the drawing. It provides a positive locking while preventing the separation of parts or components and while avoiding the possibility of loose parts which can become detached under conditions of high pressure, high temperature and high vibration. The fitting of the invention is rugged and provides for minimizing fretting or galling potential. The fitting or joint of the invention is characterized by the provision of a relatively thin wall continuous cylinder or a cylindrical arrangement of fingers extended from the end of a nut or coupling component, the wall or finger terminating in a spring loaded bulb which falls into a fitting groove after having been driven up a ramp. The joint of the invention requires simply a nut, nipple and ferrule although these can also be provided in relative mirror image of one another. The joint of the invention is moreover capable of being readily manufactured of a high temperature material such as Inconel 718, A-286 Titanium 6AL4V, or the like. It is provided with a tapered friction lock preload on the thin wall which rides up a ramp to provide additional vibration resistance. As will be noted, the tapered surfaces on the nut and nipple are coated with a lubricant or plating or the like which facilitates the installation operation and which is capable of functioning under conditions of high temperature, high pressure and extreme vibration.

In the lower temperature application, the same features, either thin wall cylinder or fingers can be provided at lighter weight and cost, using high strength aluminum, such as 7075-T651.

Figure 2:
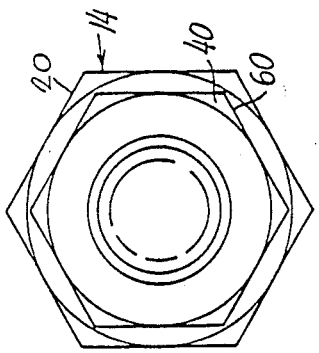
FIG. 2 is an end view of the coupling of FIG. 1.

The coupling in FIG. 1 is indicated at 10. It includes a barrel 12 including a centrally located nut or wrenching polygon 14 having coaxial nipples 16 and 18 extending in opposite directions therefrom. As seen in FIG. 2 the nut 14 has a polygonal surface 20 externally located thereon and providing for engagement by a tightening tool of commercially available type.

A portion of the associated fluid circuit or the like is indicated at 22 and 24. This portion of the fluid circuit may consist of sections of a high pressure tube/hose to be coupled to one another. In order to accomplish this, each nipple has associated therewith a ferrule such as indicated at 26. Thus, for example, nipple 16 and ferrule 26 constitute first and second parts which are axially displaceable relative to one another in order to accomplish the purpose of providing a high pressure coupling or fitting. In the illustrated embodiment of FIG. 1, the end of the tube/hose section 24 is indicated at 30. It is entrapped between the conical end 32 of the nipple 16 and the conical extremity 34 of the bore 36 of the ferrule 26. A like arrangement is possible with respect to the tube/hose 22.

The high pressure coupling of the invention moreover comprises a coupling component 40. It has an interior thread indicated at 42. This thread engages an exterior thread 44 of nipple 16. Component 40 is provided with an inwardly extending projection 46. The function of this inwardly projection 46 is to cup around a shoulder 48 provided on ferrule 26 whereby an axial force will be exerted against this shoulder dependent upon adjustment of the engagement between the threads 42 and 44.

The high pressure coupling of the invention is preferably symmetrical around an axis 50 which is centrally located in the bore 52 which extends completely through the fitting thereby to provide a fluid connection between the bore 56 of tube/hose 24 and the bore 58 of tube/hose 22. As is seen in FIG. 2, the coupling component 40 has an external surface 60 which also has the configuration of a polygon (see FIG. 2) thereby to facilitate engagement by a tightening tool. Preferably, the same type of tool is capable of engaging both the surface 20 and the surface 60.

As will be discussed in greater detail hereinbelow, the coupling component 40 is provided with a thin wall cylindrical extension or cantilever arrangement 64 terminating in a bulbous inwardly extending tip 66. The cantilever arrangement 64 consists of a plurality of fingers such as indicated at 68. These fingers are separated by slots 70 (length of slots depends on material, its thickness and lift) thereby giving rise to the cantilever nature of the finger structure. The fingers 68 are resilient and the bulbous tips of these fingers are intended to be accommodated in an annular groove or depression indicated at 74. The annular grooves 74 (and 76) are concentric with one another and with axis 50 and are spaced from the nut 14 by a distance indicated at 78, this distance being less than the breadth of the associated annular groove which breadth is indicated, by way of example, at 80.

As will be discussed in greater detail hereinbelow, during installation, the bulbous tips or the like indicated at 66 ride up the associated ramp 90 which is fashioned in the nature of a frusto-conical surface, the tips keeping the thin walls 64 spaced from the ramp until the tips 66 ride over the ramp end and drop from the same to be accommodated loosely in the associated annular groove. The fingers 68 pressing against the associated ramp vector the forces applying to the same (due to the resilient nature of the fingers) thereby to provide for a tight engagement of the threads 42 and 44. This minimizes the effects of vibration thereupon. To facilitate the installation operation and to enhance the anti-fretting or anti-galling function, the fingers, tips and ramp are preferably provided with a lubricant coating or surface or a plating (functioning as a lubricant) discussed more fully below.

Figure 3:
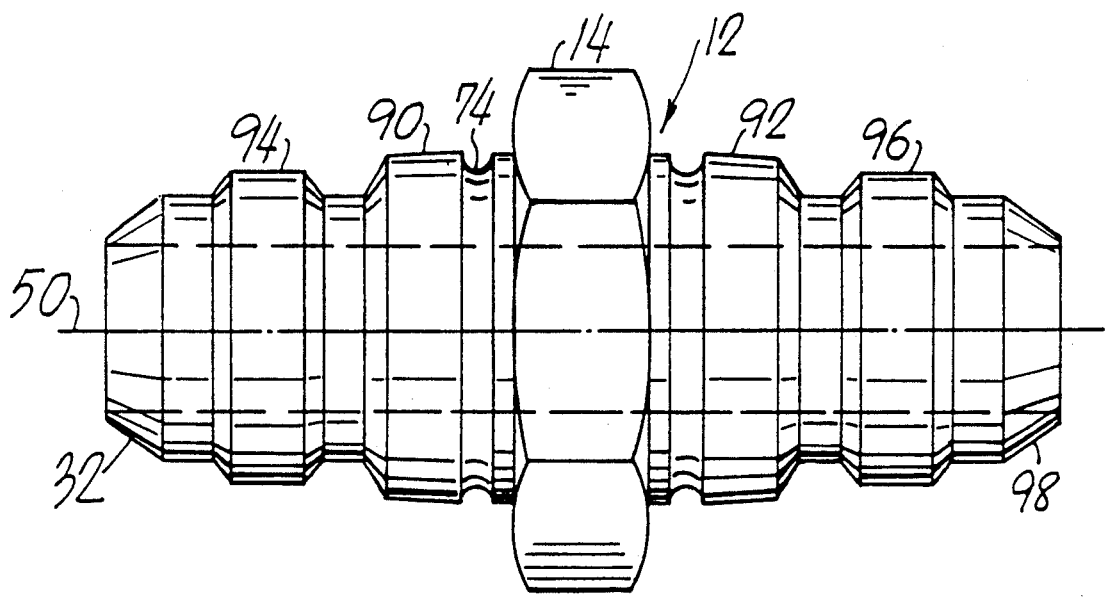
FIG. 3 is a side view of a central barrel constituting a part of the coupling of FIG. 1 prior to a threading of the same.

FIG. 3 illustrates the central barrel 12 of the high pressure fitting of FIG. 1 prior to a threading thereof. Therein it can be seen that the barrel consists of the aforementioned ramp 90, a ramp 92 being provided in mirror image thereof. The barrel moreover consists of the nut 14 of polygonal conformation as has been discussed hereinabove. It further consists of two lands 94 and 96 also provided in mirror image of one another and symmetrically arranged about the axis 50 mentioned hereinabove. These lands 94 and 96 are provided with the above-mentioned threads 44 (see FIG. 1) which are similarly concentric about the axis 50. The ends of the component 12 constitute nipples having frusto-conical surfaces 32 and 98 which cooperate with respective ferrules in order to provide a clamping action on hose extremities as mentioned hereinabove. A direct contact between the conical extremities of these nipples and the conical receptacles in the ferrules is also possible as will be discussed hereinbelow.

Figure 4:
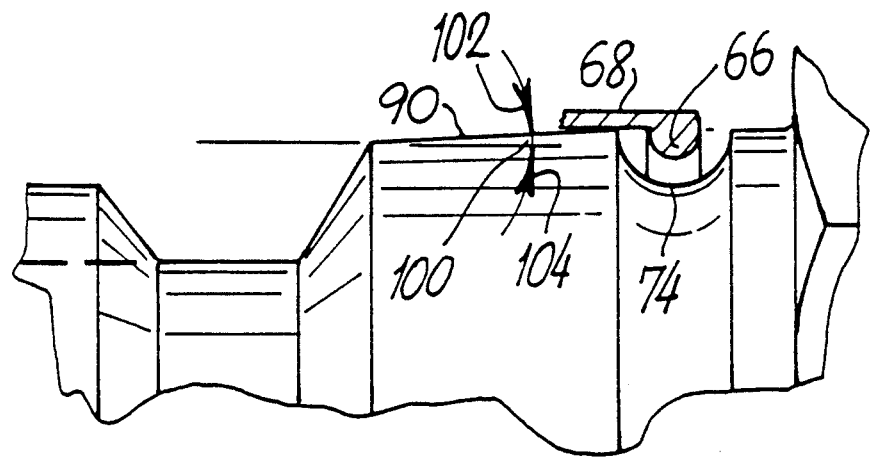
FIG. 4 illustrates on enlarged scale a detail of the barrel of FIG. 3.

The ramp 90 which constitutes an important feature of the invention is illustrated on enlarged scale in FIG. 4. In FIG. 4 is shown an illustrative finger 68 having a bulbous tip 66 which is directed radially inwards with respect to the overall structure. As will be seen in FIG. 4 the tip 66 is loosely accommodated in annular groove 74, the tip having dropped off the ramp 90 after riding up and beyond the same. The angle of the ramp which is a frusto-conical surface is indicated at 100 being defined between arrows 102 and 104. This angle is preferably an angle in the order of magnitude of about 2 degrees ±30'. The ramp 90 and preferably also the fingers 68 are provided with confronting surfaces which are eventually inter-engaged and which both are preferably provided (along with tips 66) with a lubricant or lubricant coating or plating. One such lubricant preferred for anti-galling is a lubricant supplied by E/M Corporation of New Britain, Connecticut. The product is preferably that designated as Everlube 811 which satisfies the requirements of MIL-L81329A. The lubricating pigments therein are molybdenum disulphide and graphite which are in a silicate binder. The recommended effective lubricating temperature range thereof is minus 365 degrees F to plus 1200 degrees F. A similar lubricant which can serve a suitable purpose in fittings of the invention is Esnalube 382 which also employs a molybdenum disulphide lubricating pigment in a silicate binder. It has an effective lubricating temperature of minus 365 degrees F to plus 800 degrees F. Other solid film lubricants are available. Additionally, metal platings such as, for example, silver are also useful in the prevention of galling.

A preferred material for the high temperature (approximately 1000 degrees F) barrel, ferrule and coupling component is, by way of example, Inconel 718 having a hardness of 45-47 on the Rockwell "C" scale. This material has a room temperature tensile yield strength of approximately 165,000 p.s.i. Similar results for lower temperature operation (to approximately 600 degrees F) can be obtained using titanium 6AL4V, or for temperatures to approximately 300 degrees F, 7075-T651 or other high strength aluminum The room temperature yield strength of titanium 6AL4V is approximately 145,000 p.s.i., while that of aluminum 7075-T651 is 75,000 p.s.i.

The cylindrical arrangement of fingers or leaf springs, on the coupling component requires a material of highest practical tensile strength at the specified operating temperature which will produce the smallest and lightest fitting set. Inconel 718 suits this purpose. Barrels formed of Inconel 718 which are strain hardened and heat treated may have a room temperature yield strength of approximately 200,000 p.s.i. and will allow the utilization of smaller barrels and fittings than the untreated Inconel 718 for the 1000 degree F application.

One purpose of the bulbous tips at the ends of the fingers projecting radially inwards and operating in conjunction with the annular grooves 74 and 76 is to prevent separation. This separation is intended to mean a complete disconnecting of the coupling component from the barrel which in turn would cause a catastrophic leakage of fluid at the joint. The proper length of the slots 70 is a function of the nut or barrel material and its thickness and yield strength versus the maximum deflection when the bulbous tips slide up the frusto-conical ramp of the fitting. In the preferred design, the ramp as mentioned above has an angle of about 2 degrees ±30'. It has been found, however, that a 0.5 degree ramp with a lift of approximately 0.001 to 0.003 inches is satisfactory to achieve the objectives of the invention with a slot depth of about 0.220 inches and with a wall thickness of 0.010 inches. These dimensions represent illustrative orders of magnitude to be employed in accordance with a preferred embodiment of the invention.

Figure 6:
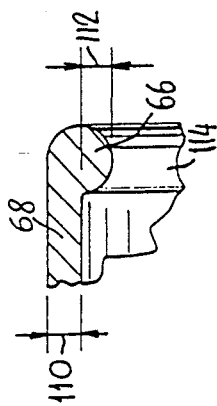
FIG. 6 shows on enlarged scale a detail of the component of FIGS. 5 and 10.
Figure 5:
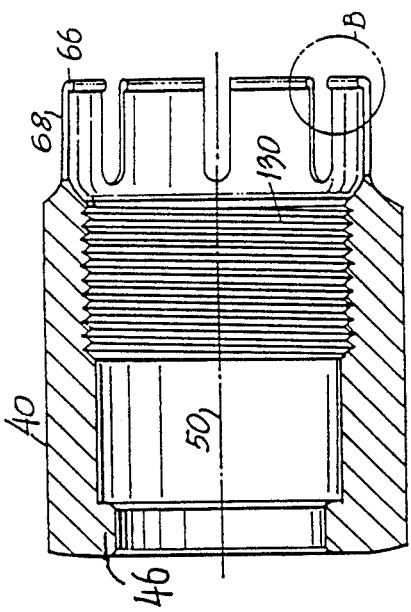
FIG. 5 illustrates in section a component of the coupling of FIG. 1.

FIG. 5 illustrates, in greater detail, the configuration of the coupling component 40 with its shoulder 46. In FIG. 5 is seen the thin wall cantilever section 68 with an illustrative bulbous inwardly directed tip 66. FIG. 6 illustrates, on an enlarged scale, details from section B of FIG. 5. In FIG. 6 appear the thin wall 68 and the bulbous tip 66. The dimension of the wall is indicated at 110, this being in the order of magnitude of about 0.010 inches. The inward projection of the bulbous tip is indicated at 112, this dimension being in the order of magnitude also of about 0.010 inches. The diameter of the bulbous tip is indicated at 114, this diameter being in the order of magnitude of about 0.020 inches.

Figure 7:
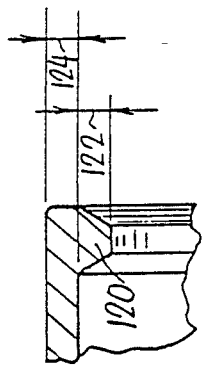
FIG. 7 illustrates a variant of the detail of FIG. 6.

Although a bulbous tip has been illustrated as the preferred embodiment a variant of this shape appears in FIG. 7. Thereat it is seen that the conformation of the tip indicated at 120 is that of a trapezoid in cross section. The inward protrusion of this tip is indicated at 122 and is in the order of magnitude of 0.010 inches with the wall thickness being indicated at 125, this being in the order of magnitude of about 0.010 inches.

The internal thread of the coupling component is indicated in greater detail at 130 in FIG. 5. The thread has the purpose, as mentioned hereinabove, of engaging the exterior thread on the barrel 12 (see FIG. 1). These threads are co-axial relative to the axis 50 of the overall structure.

Figure 8:
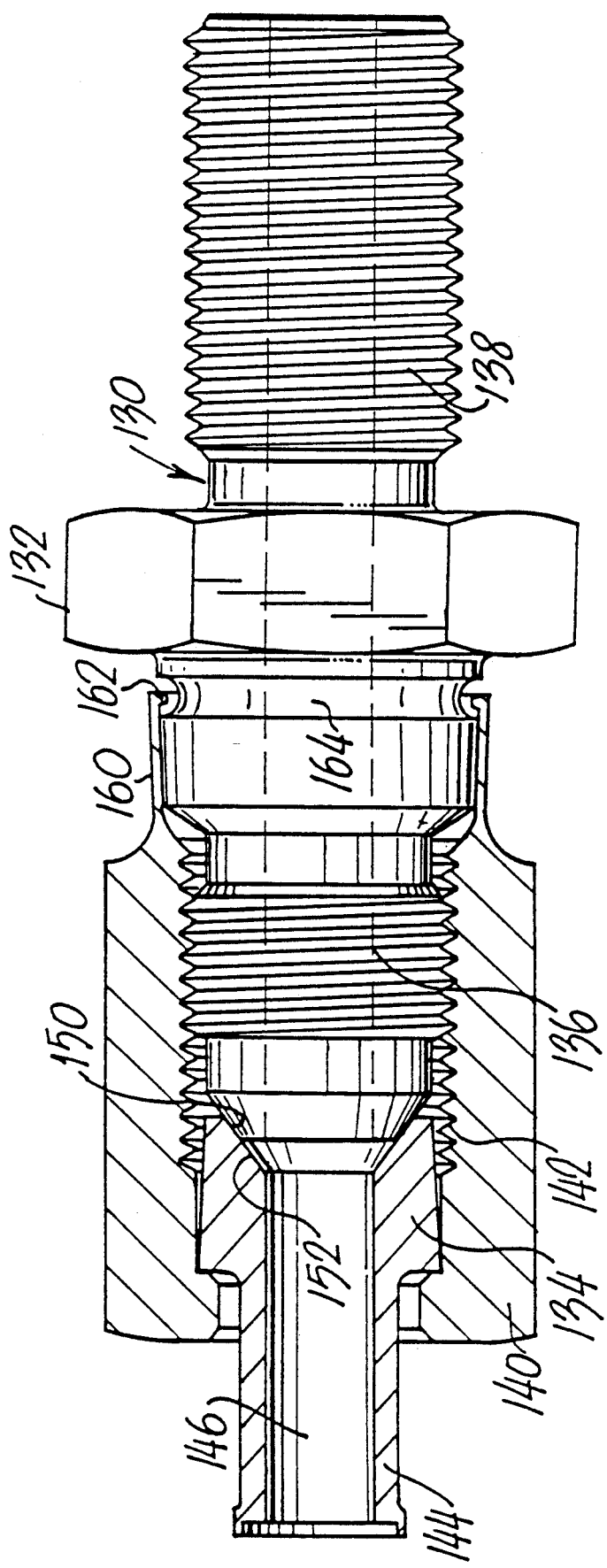
FIG. 8 illustrates a modification of the coupling of FIG. 1.

FIG. 8 shows a variant of the coupling arrangement discussed above relative to FIG. 1. The coupling arrangement of FIG. 8 includes a barrel 130 having a nut 132 as described above. The structure of FIG. 8 furthermore includes a ferrule such as indicated at 134. The barrel is threaded as indicated at 136 and 138 and an illustrative coupling member 140 is indicated as having a cooperating thread 142 on the interior bore thereof.

In this embodiment of the invention, the coupling member 140 engages a ferrule 134 having an interior bore 146 constituting a part of the fluid circuit in which the coupling operates to provide a leak proof joint under extreme conditions of heat, vibration and pressure. In the illustrated embodiment, provision is made for a direct contact between the conical surfaces 150 and 152 thereby to provide a fluid tight connection. A resilient material (not shown) of suitable strength can be employed between these confronting surface if desired.

In the embodiment of the invention illustrated in FIG. 8 there is once again provided a cylindrical arrangement of cantilever fingers indicated at 160. These fingers have inwardly projecting tips indicated at 162 accommodated in an annular groove or depression indicated at 164.

From what has been described above it will now be understood that a preferred embodiment of the invention provides a coupling which includes first and second axially displaceable parts, the first part including an exterior thread with a coupling component encircling these parts and including an interior thread to engage the exterior thread of the barrel. While these threads may be subject to a limited play therebetween, the coupling component forces the parts together responsive to adjustment of the engagement between the threads. The first part is provided with a ramp with the coupling component including a cantilever arrangement pressing against the ramp to urge the threads together and minimize the play therebetween. The provision of inwardly projecting tips (which ride up the ramp to drop into and be accommodated within an annular groove or depression) locks the parts together so that separation of these parts from one another is minimized if not completely avoided as a possibility.

By way of example, the length of a barrel in the aforecoming embodiments may be about 1.8 to 2.2 inches with the diameter of the bore therethrough being about 0.280 to 0.320 inches. The average diameter of the frusto-conical ramp may, for example be about 0.580 to 0.630 inches with the nipple taper at the end being about 35 to 40 degrees. Other dimensions are also possible within the scope of the invention the above dimensions apply to a ⅜" outside diameter tube connection. Other tubes will have larger or smaller dimensions.

Figure 10:
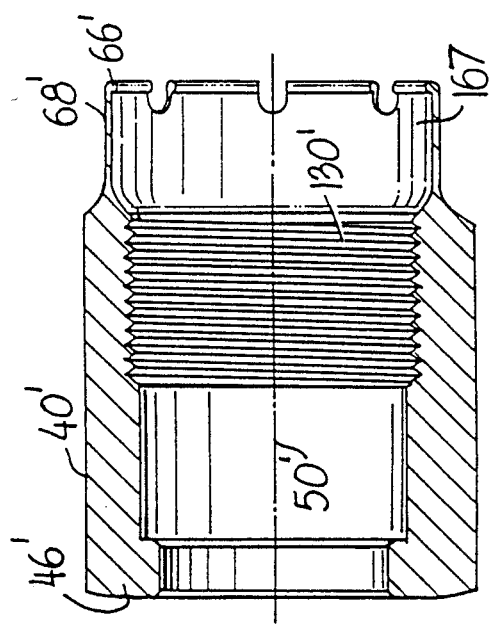
FIG. 10 illustrates in section a component (thin wall cylinder) of the coupling of FIG. 9.
Figure 9:
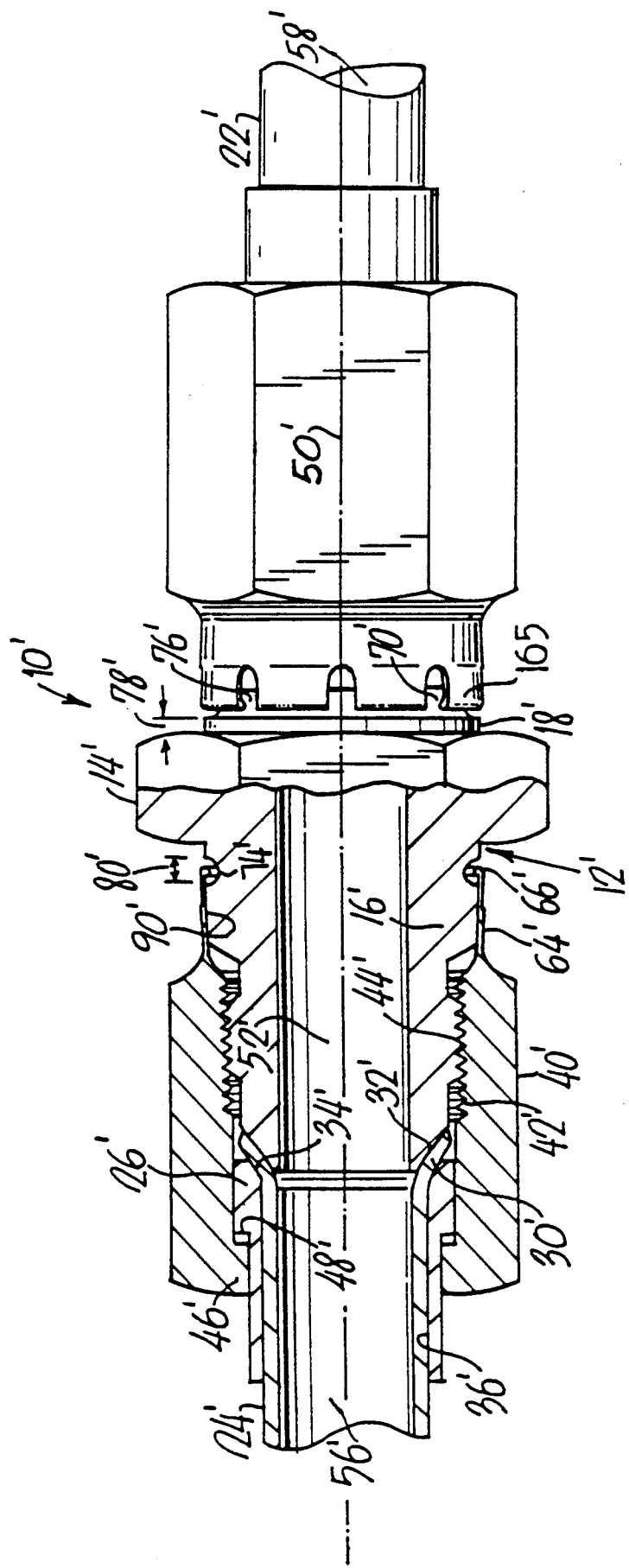
FIG. 9 is a side view, partially in section, of a high pressure coupling provided in accordance with another embodiment of the invention (thin-wall cylinder), a portion of a fluid circuit being shown in phantom lines.

FIGS. 9 and 10 show a second embodiment of the invention with parts corresponding to those in FIGS. 1-8 being primed. The embodiment of FIGS. 9 and 10 is essentially a structure employing a thin wall cylinder 165 or 167, provided with shorter slots 76' (e.g., with a length of 0.080 inches). The thin wall thickness lies in a range of about 0.007–0.020 inches and preferably is in the order of magnitude of about 0.010 inches. In this case, the cylinder proceeds up the ramp, expanding as required, until the bulbous tips drop over the ramp edge into the associated annular groove.

There will now be obvious to those skilled in the art many modifications and variations of the structures set forth hereinabove. These modifications and variations will not depart from the scope of the invention if defined by the following claims.

What is claimed is:

1. A coupling comprising first and second axially displaceable parts, said first part including an exterior thread encircling the same, coupling means encircling said parts and including an interior thread to engage said exterior thread, said coupling means forcing said parts together responsive to adjustment of the engagement between the threads, said first part including a ramp, said coupling means including cantilever means adapted for riding up the ramp; the cantilever means being positioned for pressing against said ramp to urge the threads together, said first part being provided with a depression adjacent the ramp, said cantilever means including a tip adapted for riding up the ramp and being received in loose relationship in said depression.

2. A coupling as claimed in claim 1 wherein the cantilever means presses against the ramp with said tip in said depression.

3. A coupling as claimed in claim 2 wherein the depression is an annular groove.

4. A coupling as claimed in claim 2 wherein said tip is a projection and is positioned to lift the cantilever means off the ramp until the projection is received in said depression.

5. A coupling as claimed in claim 4 wherein said projection extends radially inwards by about an order of magnitude of 0.010 inches.

6. A coupling as claimed in claim 3 wherein the ramp is of frusto-conical conformation.

7. A coupling as claimed in claim 6 wherein the cantilever means includes a substantially continuous thin wall cylinder.

8. A coupling as claimed in claim 6 wherein the cantilever means includes a cylindrical arrangement of fingers.

9. A coupling as claimed in claim 8 wherein the fingers have a thickness in the order of magnitude of about 0.010 inches and are separated by slots have a depth in the order of magnitude of about 0.220 inches.

10. A coupling as claimed in claim 8 wherein the fingers and ramp having facing surfaces at least one of which has a lubricant coating.

11. A coupling as claimed in claim 10 wherein the lubricant is molybdenum disulphide and graphite in a binder.

12. A coupling as claimed in claim 8 wherein the fingers have a tensile yield strength in the order of magnitude of at least about 165,000 p.s.i. based on a modulus of elasticity of $29.4 \times 10^6$ p.s.i.

13. A coupling as claimed in 12 wherein the fingers have a thickness in the order of magnitude of about 0.10 inches.

14. A coupling, as claimed in claim 12 wherein the thin wall cylinder has a thickness in the order of magnitude of about 0.010 inches.

15. A coupling as claimed in claim 8 wherein said first part includes a nipple having a conical end and said second part is provided with a bore having a conical extremity in which the said conical end is received, said coupling means including a protrusion for cupping against said second part to pull the same into engagement with said first part with the conical end of the nipple in the conical end of said base.

16. A coupling as claimed in claim 15 wherein the first part and coupling means include coaxial sections having polygonal surfaces adapted for engagement by tightening tools.

17. A coupling as claimed in claim 16 wherein the annular groove is spaced from the section of the first part having a polygonal surface by a distance no greater than about the breadth of said groove.

18. A coupling as claimed in claim 17 wherein the groove has a breadth in the order of magnitude of about 0.062 inches.

19. A coupling as claimed in claim 15 comprising a hose including an end entrapped between the conical end of the nipple and said second part.

20. A coupling as claimed in claim 8 wherein the cylindrical arrangement and frusto-conical ramp are coaxial.

21. A coupling as claimed in claim 8 wherein said cylindrical arrangement defines an axis and said ramp defines an axis and said ramp defines an angle of about 2 degrees ±30' with said axis.

22. A coupling as claimed in claim 8 wherein said ramp has a lift of about 0.001 to 0.003 inches.

23. A coupling as claimed in 22 wherein said ramp has an axial extent of an order of magnitude of about 0.135 inches.

24. A coupling as claimed in claim 8 wherein the cylindrical arrangement has a diameter exceeding the outer diameter of the thread on said first part.

25. A coupling comprising first and second axially displaceable parts, said first part including an exterior thread encircling the same, coupling means encircling said parts and including an interior thread to engage said exterior thread, said coupling means forcing said parts together responsive to adjustment of the engagement between the threads, said first part including a ramp, said coupling means including first cantilever means adapted for riding up the ramp; said first cantilever means being positioned for pressing against said ramp to urge the threads together, said first part being provided with a depression adjacent the ramp, said cantilever means including a tip adapted for riding up the ramp and being received in loose relationship in said depression, said coupling further comprising third and fourth axially displaceable parts, said first part being rigidly connected to said third part in axial extension thereof, said third part including an exterior thread encircling the same, further coupling means encircling said third and fourth parts and including an interior thread to engage the exterior thread on the third part, said further coupling means forcing said third and fourth parts together responsive to adjustment of the engagement between the threads of said third part and said further coupling means, said third part including a ramp, said further coupling means including second cantilever thin wall cylinder means adapted for riding up the latter said ramp; said second cantilever thin wall cylinder means pressing against said further ramp to urge the latter said threads together.

* * * * *